Jan. 24, 1967  R. J. BROERSMA ET AL  3,299,926
SKINNING MACHINE AND METHOD

Filed March 16, 1964                    2 Sheets-Sheet 1

INVENTORS
ROBERT J. BROERSMA
ERNEST M. REIMER
BY
ATTORNEYS

3,299,926
SKINNING MACHINE AND METHOD
Robert J. Broersma, Spring Lake, and Ernest M. Reimer, New Era, Mich., assignors to Wolverine Shoe & Tanning Corporation, Rockford, Mich., a corporation of Michigan
Filed Mar. 16, 1964, Ser. No. 352,124
9 Claims. (Cl. 146—241)

This invention relates to skinning apparatus for separating the skin from the meat of a slaughtered animal, and more particularly relates to a combnation flap forming apparatus and skinning machine for hogsides.

Since this apparatus is intended chiefly for separating the skin from the meat of hogsides, and since applicants and their assignee are chiefly interested in hogsides and the leather and meat products obtained therefrom, the novel apparatus and methods will be explained and described with respect thereto for convenience. However, it will be understood that the concept, structures and method described can conceivably be adapted to skinning sides of other animals within the broader aspects of this invention.

For years skinning of hogsides has been conducted by gripping the edge of the side and pulling it past a skinning blade. The gripping is conventionally achieved either with a high powered clamp which grips tightly into the meat and skin on one edge, or alternatively by sharp protuberances which puncture the skin and meat to pull the hogside past the skinning blade. Since the protuberances puncture the skin and meat, and since the gripping jaws squeeze into the meat, these damage the meat and/or skin, causing waste of one or both of the meat and skin on the edge of the hogside. The result is a loss of valuable meat, and also of skin valuable for making leather. Further, since the clamped skin and damaged meat remain on the hide after it is skinned, the meat must be fleshed off, and the skin must be severed from the remainder of the skin in subsequent operations. These require added time and effort.

It is therefore an object of this invention to provide a skinning apparatus that uniquely forms a gripping flap on the skin prior to skinning. The apparatus saves the valuable skin and meat on the edge of the hogside and does not damage it either.

It is another object of this invention to provide a skinning apparatus capable of preforming a gripping skin flap in such a manner that the flap is formed and positioned in the clamp that pulls the hogside past the skinning blade. Moreover, one jaw of the clamp cooperates with a shearing blade to help form the flap.

It is another object of this invention to provide a skinning apparatus enabling the skinning operation to be sequentially carried out with formation of the skin flap on the same apparatus. The flap is rapidly formed with one swipe of the shearing blade in cooperation with the pulling clamp.

Another object of this invention is to provide a flap forming apparatus for a skinning machine which is relatively simple in construction, rapid in operation, and adapted to cooperate with the skinning apparatus itself.

Still another object of this invention is to provide a new method of forming a skin flap on the edge of a hogside, and a method of skinning the hogside without waste or damage of the meat or skin. It eliminates the necessity of subsequent removal of damaged meat and skin by separate operation.

These and several other objects of this invention will become apparent upon studying the following specification in conjunction with the drawings in which.

Figure 1:
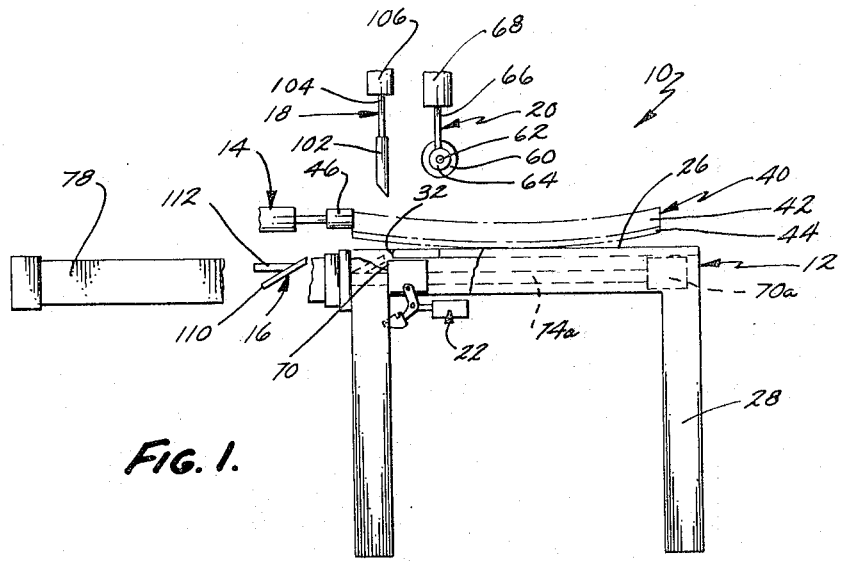
FIG. 1 is a side elevational view of the novel apparatus.

Referring now specifically to the drawings, the complete assembly 10 illustrated includes the following subassemblies: a support 12, stop means 14, skinning blade means 16, shearing blade means 18, holding means 20, and clamping means 22.

More specifically, support means 12 may be in the form of a conventional support table. It includes an upper platform surface 26 supported on a plurality of like legs 28. Support surface 26 terminates near one edge of the table with a rounded bar type edge surface 32. This edge support may be a roller or merely a rounded portion. The platform surface 26 supports a hogside 40, including the meat layer 42 and attached skin layer 44 in the manner shown in FIG. 1. It will be understood that these hogsides are somewhat arcuate in configuration due to the natural configuration of the animal. It will be also understood that the hogsides can either be from one-half of the hog, i.e. from the backbone around to the center of the belly, or may be a double hogside extending from the middle of the belly around the side, the back, the other side, and back to the middle of the belly. This depends upon the type of butchering employed. Thus, the term "hogside" is intended to broadly include both types.

Positioned near edge 32 of the support is a stop means. In the form of the invention illustrated, it comprises a pair of spaced blocks 46 and 48. These blocks are mounted to shiftable means such as the rods 50 and 52 of a pair of fluid cylinders 54 and 56. Extension of the fluid cylinders positions stop blocks 46 and 48 in the position illustrated in FIGS. 1 and 2 so that the hogside 40 can be abutted against them when placed on the support. The stops are so located that the hogside overlaps edge 32 to form a skin flap of the same length as the overlap. The stops can be shifted out of the position shown, in a manner illustrated schematically in FIGS. 4 and 5 by retraction of the fluid cylinders.

Positioned above platform 26 near edge 32 is holding means 20. This holding means may assume several different forms, but preferably is in the shape of roller means 60 supported on end shafts 62. The shafts are mounted in end collars 64 to rotate freely therein. These collars are in turn attached to extended rods 66 of a pair of fluid cylinders 68 and 68'. These cylinders are mounted to suitable overhead support means (not shown) so that extension of the cylinders causes roller means 60 to be forced against the upper meat portion of the hogside. This forces the lower skin of the hogside down against support surface 26. This not only flattens the hogside into proper relationship with the support, but also holds the hogside when shearing mechanism 18 is actuated in a manner to be described. The roller holding means continually flattens the hogside as it is pulled past the skinning apparatus as described hereinafter.

Mounted beneath support platform 26 is clamping means 22. This clamping means includes a pair of jaws, one of which 70 is an elongated rigid support extending transversely across the end of the table beneath edge 32 of the platform. The ends of this jaw 70 are supported by and attached to a pair of rods 72 and 74 of a pair of fluid cylinders 76 and 78. The forward ends of these fluid cylinders are mounted fixedly to opposite side edges of the platform by suitable collar connections 80 and 82.

Actuation of the fluid cylinders to extend them causes the jaw 70 to move from its first position illustrated in FIGS. 1 through 4, to a second position illustrated in phantom lines at 70a with the rods extended as at 74a in FIG. 1.

Pivotally mounted to this "jaw" 70 is a second shiftable jaw 86. This elongated second jaw has attached to both ends thereof a pair of clamping links 88. These two clamping links are actuated by fluid cylinder means 90 due to the connection of the extended end of rod 92 from the fluid cylinder to the intermediate portion of links 88. The fluid cylinder body is attached by bracket means 94 to jaw 70 on a pivotal mount. Consequently, extension of rod 92 of the fluid cylinder causes spaced links 88 to pivot on jaw 70 and move jaw 86 from the "open" position illustrated in FIG. 3 to the closed position illustrated in FIG. 4.

The two clamping jaws and the fluid cylinder shift simultaneously under the support when the larger shifting air cylinders 76 and 78 are actuated to extend the clamping means along the underside of the table.

It will be noted that jaw 70 includes a frontal vertical planar flat surface 100 which is substantially aligned with the rounded edge 32 of platform 26. The position of jaw 70 is controlled by fluid cylinders 76 and 78 which stop in a predetermined position. Surface 100 serves as a guide and a retainer surface for the edge flap forming operation.

Cooperating with this surface is a vertically reciprocable shearing blade 102 which, combined with extended rods 104 of the fluid cylinders 106, on opposite ends thereof, forms the shearing means 18. This shearing blade is positioned so that its sharp edge reciprocates past the edge 32 of platform 26 at a controlled spacing therefrom, and moves vertically parallel to surface 100 at a controlled spacing therefrom equal to the thickness of the skin 44 on the hogside. When this blade is lowered, therefore, it slices through the meat 42 and deflects the frontal edge of the tougher skin 44 around the edge 32 and against the flat surface 100 of block 70. Continued lowering of the blade shears the piece 42' of edge meat from the edge 44' of the skin. The clearance allows the skin to remain unsevered. The skin abuts the block to prevent further deflection, thereby causing a neat severance of the meat from the skin.

Figure 2:
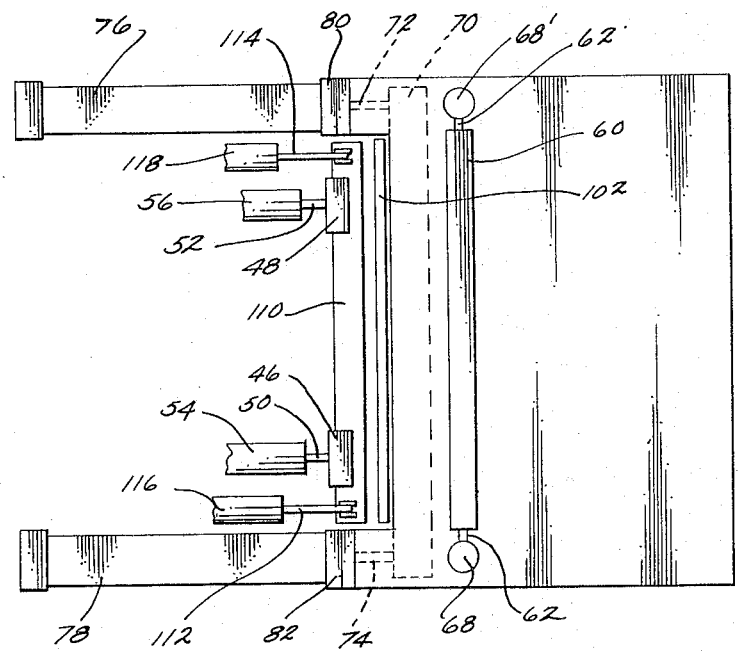
FIG. 2 is a plan view of the apparatus illustrated in FIG. 1.
Figure 3:
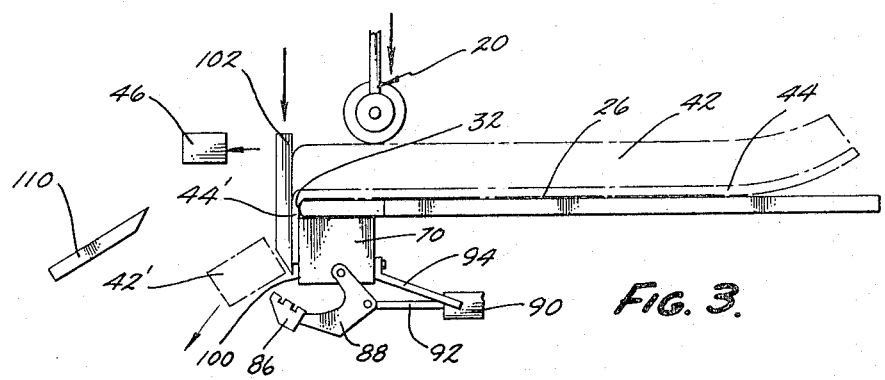
FIG. 3 is a schematic view showing the first step of operation of the aparatus and the novel method.
Figure 4:
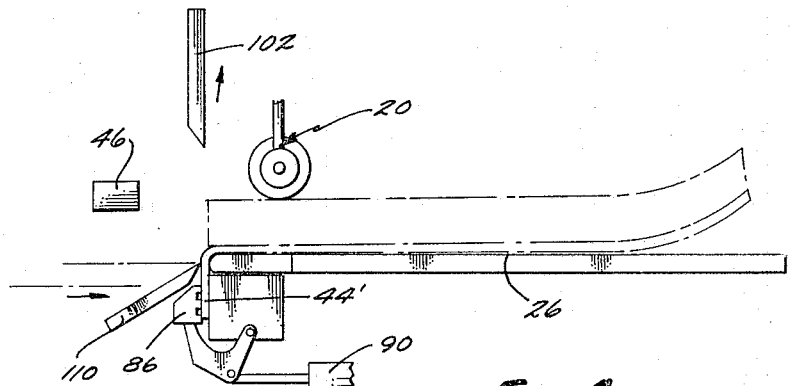
FIG. 4 is a schematic view showing the second step of operation.

Also positioned adjacent the edge 32, and at an obtuse angle with respect to the upper surface of the horizontal platform 26 is a skinning blade 110. This forms part of skinning blade means 16. This blade is preferably supported in end slide supports 111 and 112. The extended ends of a pair of piston rods 112 and 114 of fluid cylinders 116 and 118 illustrated in FIG. 2 are attached to this blade. This blade can be reciprocated from an active position closely adjacent edge 32 (as illustrated in FIG. 4) to a retracted position (illustrated in FIG. 3).

Obviously the cylinders are all supported on suitable standards which would only be superfluous to the structure illustrated and therefore are not shown in detail. It will also be realized that several of these extension-contraction cylinders could be substituted by equivalent mechanical apparatus with equal facility. Since hydraulic or pneumatic cylinders lend themselves to complete automation by proper adaption of valving techniques, these are preferred and are illustrated as part of the preferred form of the invention.

OPERATION

In operation, to remove skin 44 from meat 42 of the animal meat product, the hogside is first placed upon support platform 26 with the skin downward. It is pushed forwardly toward and over edge 32 of the platform until the hogside strikes stop blocks 46 and 48. At this position, the hogside overlaps edge 32 and clamp jaw 70 to the length of the skin flap to be formed.

Subsequently, fluid cylinders 68 and 68' of holding means 20 are actuated to extend roller 60 down against the hogside. This flattens it out and holds it in position as illustrated in FIG. 3. Then stop blocks 46 and 48 are retracted by contracting cylinders 54 and 56. As soon as they are out of the way, cylinders 106 for shearing blade 102 are actuated to extend them, lowering the shearing blade through the meat and against the skin. The skin flap 44' is caused to bend around the frontal edge 32 of platform 26, while the blade continues to shear through the meat. Since the skin abuts surface 100 of clamp jaw 70, it is not allowed to move further, thereby causing the meat to be completely severed and not deflected back underneath the platform. On the other hand, the skin itself is not severed since the specific clearance provided between the plane of action of the sharp shearing edge and surface 100 allows the skin to neatly fit within this clearance. The meat 42' sliced from the edge is useful for its intended purpose.

Thereafter, the shearing blade is retracted upwardly as illustrated in FIG. 4. The clamping jaw cylinders 90 then extend to pivot jaw 86 up around and into contact with the formed skin flap 44'. Since the skin flap is formed against the surface of jaw 70, it is in position for immediate clamping for the next operation. Simultaneously, skinning blade 110 is shifted into its operative position a fraction of an inch from the edge of platform 26 and at an obtuse angle with respect thereto.

It will be understood that this skinning blade 110 can be rotated on a longitudinal axis to control its obtuse angle to the platform. Also, its particular depth of cut can be controlled by determining its exact position with respect to edge 32 of the platform. Since the average hogside will vary in skin thickness from the belly portion around the side and the fat back portion, this depth and the angle of cut is preferably controlled on a programmed basis. Since this does not form a particular part of this invention, however, specific structural details to achieve this are not shown. This is all described and claimed in copending application entitled Skinning Machine, filed Nov. 13, 1962, Ser. No. 236,862, now U.S. Patent No. 3,249,139 and assigned to the assignee herein.

Figure 5:
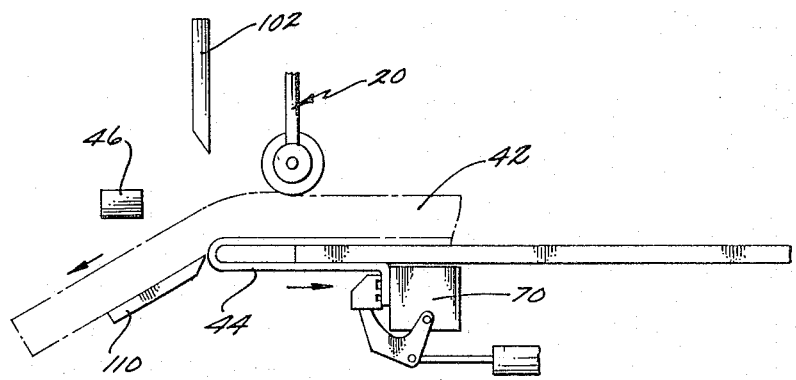
FIG. 5 is a schematic elevational view showing the third step of the operation.

With the skin flap firmly clamped and the skinning blade 110 in position, the skinning operation proceeds by extension of cylinders 76 and 78 to push the clamping means along the underside of the table, thereby pulling the skin around edge 32 and past the skinning blade. The hogside is "skinned" with the meat passing over the top of the skinning blade 110 as illustrated in FIG. 5 and the skin being pulled along the underside. The holding means 20 remains in contact with the hogside to continually force it to proper configuration for optimum skinning. Since the skin is pulled around at a large obtuse angle, the stress on the meat and fat fibers becomes so great that the sharp blade readily severs it from the skin, rather than having to "plow" through the material. The separation at this angle causes a "pebble" type finish on both the skin and flesh due to the globules of fat.

As soon as complete separation is made between the skin and meat, the clamping mechanism is opened to drop the skin into a suitable container or onto a conveyor for removal for the next operation. The meat passes into suitable conveying means for transport to another processing operation.

The holding means 20 is retracted vertically, the skinning blade is retracted, the clamping means is returned to its initial position for cooperation with the next shearing action, and the stop means are extended to abut the next hogside. The entire operation as explained is then repeated.

It will be understood that each of these operations can be automatically controlled with hydraulic air or electrically actuated valving means to the respective cylinders. By means of this mechanism, none of the skin and none of the meat is damaged. Thus, both are useful for their respective purposes.

Certain additional advantages not specifically recited will readily occur to those in this art upon studying the preferred illustrated form of the invention. Also, it is entirely conceivable that certain obvious modifications in structural details may be made to suit a particular adaptation of the apparatus or to suit particular design considerations. Therefore, this invention is intended to include these obvious modifications, and is not to be limited to the particular details illustrated. It is to be limited only by the scope of the appended claims and the reasonably equivalent structures and methods to those defined therein.

We claim:

1. Skinning apparatus comprising: support means for the animal side; skinning blade means, and skin clamping means movable with respect to said skinning blade means to pull the side past the skinning blade means; guide and retention surface means adjacent the support means; guide and shear blade means mounted to move generally parallel to said surface means and generally transverse of said support means at a skin-thickness-spacing from said surface means to shear the meat from a skin edge and form a clamping flap of skin just prior to movement of said clamping means with respect to said skinning blade means.

2. The skinning apparatus in claim 1 wherein said clamping means includes one element having a planar surface forming said surface means.

3. Skinning apparatus for separating the skin from the meat of an animal side, comprising: a support around which the skin is passed; skinning blade means adjacent said support for slicing the meat from the skin; clamping means adjacent said blade means, movable from a first position to a second position to pull the skin around said support and past said blade means; said clamping means including a pair of jaws; a reciprocable shearing blade adjacent said support and mounted to reciprocate past said support, generally transversely thereto and slice an edge chunk of meat from the skin; and one of said jaws having a skin retention surface spaced from said shearing blade about the space of animal skin thickness, to retain the meat from bending out of the path of the shearing knife, while allowing the skin to deflect and remain unsevered, thereby forming a skin flap for said clamping means.

4. Apparatus for forming a skin flap on an animal side of meat having skin and meat integrally attached, comprising: support means for laying an animal side with its skin and meat thereon, with the skin closest said support means; a skin guide and retention surface at an angle to said support means; and shearing means mounted to shift past said support means generally transverse to said support means and to an animal side thereon and alongside said surface at a skin-thickness-spacing therefrom to sever edge meat from the edge skin of a side, while binding the edge skin against said surface to form a skin flap.

5. Skinning apparatus comprising: a support platform for a hogside; shiftable stop means adjacent one end of said platform to locate a hogside thereon; shiftable pressure roll holding means above said end of said support platform to hold the hogside against said support platform; skin clamping means beneath said support platform, including one surface adjacent the edge of said one support platform end and generally vertically oriented with respect to the support platform; a vertically shiftable shear blade above said support platform end in a plane displaced from said vertical surface the thickness of a hogside skin, allowing said shear blade, when lowered, to shear meat from the edge of skin and form a clamping skin edge flap adjacent said surface; shiftable skinning blade means adjacent said end of said support platform, at an obtuse angle thereto; and said clamping means being shiftable along the underside of said support platform to pull said hogside past said skinning blade while gripping said flap.

6. Skinning apparatus comprising: a support for a hogside; shiftable pressure holding means above said end of said support to hold the hogside against said support; skin clamping means including one surface adjacent the edge of said one end and at an angle to the support; a shiftable shear blade adjacent said support end shiftable in a plane parallel to and displaced from said surface the thickness of a hogside skin, allowing said shear blade, when lowered, to shear meat from the edge of the skin to form a clamping skin edge flap adjacent to said surface; skinning blade means adjacent said end of said support; and said clamping means being shiftable to grip the flap and pull the hogside past said skinning blade.

7. The method of forming a clamping flap of skin on a side of meat, which includes meat and attached skin, comprising the steps of: supporting the side of meat generally in a plane; overlapping one edge of the side over a guide surface, with the skin adjacent thereto and at an angle thereto; and passing a shearing blade through the meat, transversely to said plane and parallel to the guide surface at a skin thickness spacing therefrom, forcing said skin to bend around said angle and against said surface, and shearing the meat therefrom to form a skin flap.

8. The method of skinning an animal side, comprising the steps of: positioning a side of meat, having meat and attached skin, in overlapping relationship of an edge of a support, with the skin side adjacent the support; providing at said edge a flat guide surface at an angle to said support; and passing cutting means through the meat generally parallel to said guide surface and at a slight spacing therefrom, causing the skin to bend around the edge and against said surface and remain unsevered while the meat is sliced therefrom; positioning a skinning blade adjacent said support; gripping said flap of skin, and pulling said side from said support and past the skinning blade to sever the skin from the meat.

9. The method of skinning an animal side, comprising the steps of: supporting a side of meat including the meat and attached skin; placing one edge of the side overlapping a flat guide surface, with the skin closest thereto and at an angle thereto; passing a shearing blade through the meat, parallel to said flat guide surface at skin-thickness-spacing therefrom, forcing said skin to bend around said angle against said surface and shearing the meat therefrom to form a skin flap; clamping said skin flap, and pulling said side past a skinning blade to separate the meat and skin completely.

References Cited by the Examiner

UNITED STATES PATENTS 1,418,104   5/1922   Spiselman _____ 146—104

ANDREW R. JUHASZ, Primary Examiner.

W. GRAYDON ABERCROMBIE, Examiner.